(12) United States Patent
Autran et al.

(10) Patent No.: US 7,927,698 B2
(45) Date of Patent: Apr. 19, 2011

(54) FIBERS AND NONWOVENS COMPRISING POLYETHYLENE BLENDS AND MIXTURES

(75) Inventors: Jean-Philippe Marie Autran, Wyoming, OH (US); Kelyn Anne Arora, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/842,102

(22) Filed: Jul. 23, 2010

(65) Prior Publication Data

US 2010/0286338 A1 Nov. 11, 2010

Related U.S. Application Data

(62) Division of application No. 11/729,532, filed on Mar. 29, 2007, now Pat. No. 7,776,771, which is a division of application No. 11/042,236, filed on Jan. 25, 2005, now Pat. No. 7,223,818.

(60) Provisional application No. 60/539,299, filed on Jan. 26, 2004.

(51) Int. Cl.
*D02G 3/00* (2006.01)
*C08L 23/04* (2006.01)
*C08L 23/08* (2006.01)

(52) U.S. Cl. .................. 428/364; 525/191; 525/240

(58) Field of Classification Search .......... 428/364; 525/191, 240

See application file for complete search history.

(56) References Cited

U.S. PATENT DOCUMENTS

| | | | |
|---|---|---|---|
| 3,247,290 A | 4/1966 | Werkman et al. | |
| 4,115,499 A | 9/1978 | Salyer et al. | |
| 4,842,922 A | 6/1989 | Krupp et al. | |
| 4,990,204 A | 2/1991 | Krupp et al. | |
| 5,112,686 A | 5/1992 | Krupp et al. | |
| 5,254,299 A | 10/1993 | Krupp et al. | |
| 6,015,617 A | 1/2000 | Maugans et al. | |
| 6,199,437 B1 | 3/2001 | Kumaraswamy et al. | |
| 6,482,895 B2 | 11/2002 | Maugans et al. | |
| 6,720,388 B1 | 4/2004 | Demain | |
| 6,770,356 B2 | 8/2004 | O'Donnell et al. | |
| 6,770,713 B2 | 8/2004 | Hanke et al. | |
| 6,896,843 B2 | 5/2005 | Topolkaraev et al. | |
| 6,939,919 B2 | 9/2005 | Tau et al. | |
| 6,969,741 B2 | 11/2005 | Lustiger et al. | |
| 7,223,818 B2 | 5/2007 | Autran et al. | |
| 7,776,771 B2 | 8/2010 | Autran et al. | |
| 2003/0171054 A1* | 9/2003 | Bansal | 442/361 |
| 2004/0038612 A1 | 2/2004 | Forbes et al. | |
| 2004/0063861 A1 | 4/2004 | Lustiger et al. | |
| 2004/0161992 A1 | 8/2004 | Clark et al. | |
| 2004/0197588 A1 | 10/2004 | Thomas et al. | |
| 2005/0037194 A1 | 2/2005 | Greene et al. | |
| 2005/0164586 A1 | 7/2005 | Autran et al. | |

FOREIGN PATENT DOCUMENTS

| | | |
|---|---|---|
| EP | 0 314 151 A2 | 5/1989 |
| EP | 1 443 132 A2 | 8/2004 |
| EP | 1 566 475 A1 | 8/2005 |
| WO | WO 98/59000 | 12/1998 |
| WO | WO 03/057468 A1 | 7/2003 |
| WO | WO 2004/005601 A1 | 1/2004 |
| WO | WO 2004/041538 A1 | 5/2004 |
| WO | WO 2004/060982 A1 | 7/2004 |
| WO | WO 2004/061173 A2 | 7/2004 |
| WO | WO 2004/061181 A1 | 7/2004 |
| WO | WO 2004/067818 A2 | 8/2004 |

* cited by examiner

*Primary Examiner* — Nathan M Nutter
(74) *Attorney, Agent, or Firm* — Andrew A Paul

(57) ABSTRACT

Fibers (including bicomponent fibers) comprising polymeric blends and polymeric mixtures that incorporate a blend of a first polyethylene and a second polyethylene are described. The first and second polyethylenes have a predetermined relationship for the density and the melt index of the individual polyethylenes.

11 Claims, 1 Drawing Sheet

FIBERS AND NONWOVENS COMPRISING POLYETHYLENE BLENDS AND MIXTURES

CROSS REFERENCE TO RELATED APPLICATION

This application is a divisional of U.S. application Ser. No. 11/729,532 filed on Mar. 29, 2007 now U.S. Pat. No. 7,776,771 which is a divisional of U.S. application Ser. No. 11/042,236 filed on Jan. 25, 2005, now U.S. Pat. No. 7,723,818 which claims the benefit of U.S. Provisional Application No. 60/539,299, filed Jan. 26, 2004, the substances of which are incorporated herein by reference.

FIELD OF THE INVENTION

Polymeric blends and polymeric mixtures comprising a mixture of a first polyethylene and a second polyethylene are provided. Also provided are fibers and nonwoven materials comprising fibers which comprise the polymeric blends, and/or the polymeric mixtures.

BACKGROUND OF THE INVENTION

Polyolefin resins, such as polyethylene, for use in nonwovens are difficult to produce and pose additional challenges compared to polyolefin resins suitable for films. This is because the material and processing requirements for production of fibers are much more stringent than for producing films. For the production of fibers, the residence time available for structure formation is typically much shorter and flow characteristics are more demanding on the material's physical and rheological properties. Also, the local shear/extensional rate and shear rate are much greater in fiber production than other processes and, for spinning very fine fibers, small defects, slight inconsistencies, or phase incompatibilities in the melt are not acceptable for a commercially viable process.

Generally, smaller fiber diameters will enable softer nonwovens. Softer nonwovens are desirable as they are gentler to the skin, feel right to the touch and help provide a more garment-like aesthetic for diapers, wipes and similar products.

Another desirable attribute sought in the fibers comprising nonwovens, besides softness, is abrasion resistance. Abrasion resistance is also important since it ensures that both the fibers and the nonwovens possess sufficient mechanical integrity during use so as to not fall apart and produce undesirable fuzz or lose aesthetics.

Nonwovens that are capable of high extensibility at relatively low force are also desired. These can be used to provide sustained fit in products, such as diapers and the like, and facilitate the use of various mechanical post-treatments. Typically, it has been found that having both a smaller fiber diameter and an easy to extend fiber are difficult to achieve. This is because, when the fiber diameter is reduced, it is commonly done by increasing the spinning speed or draw ratio during spinning which decreases extensibility of the fiber in post mechanical treatment due to increased polymer orientation.

More recently, there has also been a growing need in the industry for nonwovens that can also exhibit significant extensibility or cold-drawability when used in disposable products. Indeed, for absorbent articles such as diapers and catamenials, solid-state activation processes have become an integral part of the fabrication of many chassis components. Such processes can provide important functional benefits: improved softness or hand that increase a nonwoven's comfort and feel; added loft, texture or aperturing that enhance visual appearance, alter transport properties or desirably modify mechanical properties. In such processes, however, the nonwoven needs remain intact after being stretched at high a strain rate and maintain all or most of its original mechanical integrity.

One way the art has used to address these issues is to blend various polymeric resins. For example, U.S. Pat. Nos. 4,842,922 and 4,990,204 discuss blends of a high molecular weight linear polyethylene and a low molecular weight linear polyethylene for use in production of spun-bonded fibers. U.S. Pat. No. 5,122,686 discusses blends of high and low molecular weight linear polyethylenes for extrusion of staple fibers. Also, U.S. Pat. No. 6,015,617 describes blends of a first homogeneous ethylene/α-olefin interpolymer and a second polymer (either an ethylene homopolymer or an ethylene/α-olefin interpolymer) directed to improved bond performance. However, there is a continuing need for improved nonwoven materials.

As noted above, there clearly exists an unmet need for highly extensible nonwovens with fibers that can be made from commercially available thermoplastic resins without the need for high cost specialty polymers or elastic polymers or complex manufacturing processes. It is well known that, as spinning speeds increase, molecular orientation increases, stress to further deform the fiber increases and fiber elongation decreases. This is ideal for producing low denier fibers with high strength and low deformability. However, producing fine fibers with high extensibility at an affordable cost remains a very significant challenge.

There is also a need for a polyethylene material suitable for use in a fibrous nonwoven which is readily extensible and has improved abrasion resistance.

SUMMARY OF THE INVENTION

A first aspect of the present invention provides a polymeric blend comprising at least:
(a) a first polyethylene with a density $\rho_1$ and a melt index $MI_1$; and
(b) a second polyethylene with a density $\rho_2$ and a melt index $MI_2$;
where the polymeric blend has a density $\rho_b$ between about 0.920 g/cm³ and about 0.950 g/cm³ and a melt index $MI_{pa}$, between about 10 g/10 minutes and about 40 g/10 minutes, wherein:

$\rho_1 < \rho_b < \rho_2$, and $MI_1 < MI_b < MI_2$.

Preferably, there is also a minimum difference of about 0.015 g/cm³ between $\rho_1$ and $\rho_2$ and a minimum ratio $MI_2:MI_1$ of at least about 2.0:1.0.

In a preferred embodiment of the present invention, the first polyethylene has a density $\rho_1$, between about 0.900 g/cm³ and about 0.935 g/cm³ and a melt index $MI_1$, between about 5 to about 25 and the second polyethylene has a density $\rho_2$ between about 0.935 g/cm³ and about 0.965 g/cm³ and a melt index $MI_2$, between about 25 g/10 minutes and about 50 g/10 minutes.

In alternative embodiments of the present invention the polymeric blend can comprise one or more additional polyethylenes and the polymeric blend can be blended with an adjunct.

In additional embodiments of the present invention the polymeric blend or the blend/adjunct blend can be extruded into fibers that are suitable for use in nonwoven materials. The fibers can either comprise the above mentioned polymeric compositions or be in a bi- or multi-component form further comprising one or several additional resin(s). Such additional resin(s) may also include the blends of the present invention.

All documents cited are, in relevant part, incorporated herein by reference; the citation of any document is not to be construed as an admission that it is prior art with respect to the present invention. All percentages, ratios and proportions are by weight, and all temperatures are in degrees Celsius (° C.), unless otherwise specified. All measurements are in SI units unless otherwise specified.

DETAILED DESCRIPTION OF THE INVENTION

Definitions

Figure 1:
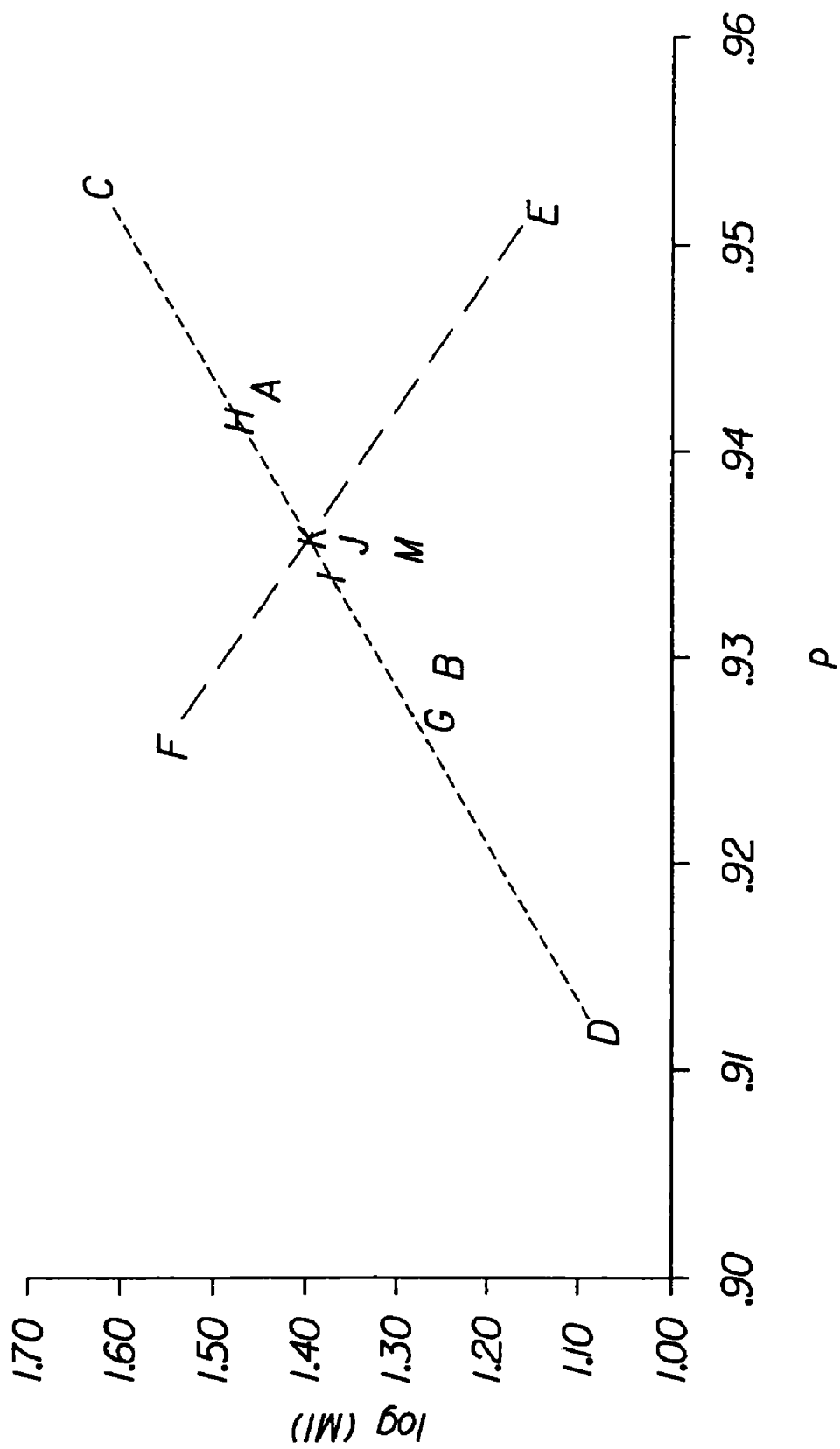
FIG. 1 is a graph showing the relationship between the polymeric blends and mixtures of the present invention and prior art polymeric blends along with the properties of the resins used to produce the blends.

As used herein, the term "polymeric blend" means a mixture of polymeric resins which includes, but is not limited to, homopolymers, copolymers (e.g., block, graft, random and alternating copolymers), terpolymers, etc., and blends and modifications thereof which is in the form of a solid solution, considered to form a substantially homogeneous mixture. Optional adjuncts may be added to the polymeric blend and, if the blend remains a solid solution, such blends are also considered polymeric blends.

As used herein, the term "polymeric mixture" means a mixture of a polymeric blend and an adjunct, described herein, in which one or more of the components of the adjunct are clearly immiscible in the polymeric blend, i.e., the mixture is heterogeneous. For example, the adjunct is insoluble in one or both of first and second polyethylenes.

As used herein, the term "spunbonded fibers" refers to small diameter substantially continuous fibers that are formed by extruding a molten thermoplastic material as filaments from a plurality of fine, usually circular, capillaries of a spinneret with the diameter of the extruded filaments then being rapidly attenuated by drawing using conventional godet winding systems or through air drag attenuation devices. If a godet system is used, the fiber diameter can be further reduced through post extrusion drawing.

As used herein, the term "extensible" refers to any fiber, which, upon application of a biasing force, is elongatable to at least about 200 percent without experiencing catastrophic failure, preferably to at least 400 percent elongation without experiencing catastrophic failure, and more preferably to at least 600 percent elongation without experiencing catastrophic failure and most preferably to at least 800 percent elongation without experiencing catastrophic failure. The percent elongation to break can be determined as described in the TEST METHODS section below and is defined as the expanded length at break minus the initial test gauge length divided by the initial test gauge length multiplied by 100.

As used herein, the "equivalent diameter" of a noncircular cross section fiber is the diameter of a circle having the same cross-sectional area as the fiber.

As used herein, the term "nonwoven web", or "nonwoven material" refers to a web that has a structure of individual fibers or threads which are interlaid, but not in any regular, repeating manner. Nonwoven webs have been, in the past, formed by a variety of processes, including, but not limited to, air laying processes, meltblowing processes, spunbonding processes and carding processes.

As used herein, the terms "consolidation" and "consolidated" refer to the bringing together of at least a portion of the fibers of a nonwoven web into closer proximity to form a site, or sites, which function to increase the resistance of the nonwoven to external forces, e.g., abrasion and tensile forces, as compared to the unconsolidated web. "Consolidated" can refer to an entire nonwoven web that has been processed such that at least a portion of the fibers are brought into closer proximity, such as by thermal point bonding. Such a web can be considered a "consolidated web". In another sense, a specific, discrete region of fibers that is brought into close proximity, such as an individual thermal bond site, can be described as "consolidated".

As used herein, the term "absorbent article" refers to devices that absorb and contain body exudates, and, more specifically, refers to devices that are placed against or in proximity to the body of the wearer to absorb and contain the various exudates discharged from the body.

The term "disposable" is used herein to describe absorbent articles that are not intended to be laundered or otherwise restored or reused as an absorbent article (i.e., they are intended to be discarded after a single use and, preferably, to be recycled, composted or otherwise disposed of in an environmentally compatible manner).

Polymeric Blend

The polymeric blends of the present invention include at least a first polyethylene and a second polyethylene. Without being bound by theory, it is believed that the polymeric blends of the present invention combine the best features of the component polyethylenes. In particular, it is believed that: 1) the low density, low melt index component provides strength to fibers comprising the polymeric blends (e.g., tensile strength at break) resulting in high bond strength, good abrasion resistance and improved stability in a consolidated nonwoven web by supplying a high molecular weight "backbone" to the blend and 2) the high density, high melt index component provides improved extrusion line throughput, fiber drawdown and cold extensibility compared to prior art fibers having a comparable tensile strength at break by being less prone to undergoing flow-induced crystallization in the early stages of the spinning process (see Kornfield, J. Proceedings Short course: Flow/Process Induced Crystallization of Polymers, Materials Engineering and Sciences Division, American Institute of Chemical Engineers, 2002 Annual Meeting, Indianapolis, Nov. 3, 2002). The art has failed to recognize that, by precisely selecting the constituent resins with regard to both density and melt index, such a desirable combination of properties can be achieved in the context of crystallization under high shear or elongational flow, as is encountered in fiber-spinning processes. It has been found that the multi-dimensional (density and melt index) assessment of resins described herein provides improved blends that have meaningful improvements in these properties.

The polymeric blends of the present invention have a density $\rho_b$ of from about 0.920 g/cm$^3$ to about 0.950 g/cm$^3$, preferably from about 0.925 g/cm$^3$ to about 0.945 g/cm$^3$, more preferably from about 0.930 g/cm$^3$ to about 0.940 g/cm$^3$. The density of the polymeric blend, $\rho_b$ is greater than the density of the first polyethylene $\rho_1$ while also being less than the density of the second polyethylene $\rho_2$. Preferably there is also a minimum difference of about 0.015 g/cm$^3$ between $\rho_1$ and $\rho_2$, more preferably the difference is at least about 0.020 g/cm$^3$. It is believed that this density difference helps insure that premature flow induced crystallization is minimized and that the benefit of the compositions of the present invention is maximized. A method for measuring density is provided in the TEST METHODS section below.

Furthermore, the polymeric blend of the present invention has a melt index $MI_{pa}$. Typically the melt index of the polymeric blend $MI_b$ is between about 10 g/10 minutes to about 40 g/10 minutes, preferably from about 15 g/10 minutes to about 35 g/10 minutes, more preferably from about 20 g/10 minutes to about 30 g/10 minutes. The $MI_b$ of the polymeric blend is greater than the $MI_1$ of the first polyethylene while also being less than the $MI_2$ of the second polyethylene. A Melt Index ratio ($MI_2$:$MI_1$) of at least about 2.0:1.0 is also particularly preferred, more preferably at least about 2.5:1.0. Without being bound by theory, it is believed that such a ratio helps insure that only the minimum required quantity of low melt index resin necessary to provide desired mechanical properties is a component of the blend. A method for measuring melt index is provided in the TEST METHODS section below. Alternatively, if there is not enough sample for melt index determinations or if it is necessary to determine melt flow rate of fractions of a blend, an alternative molecular weight measure, such as gel permeation chromatography, can be used and known correlations between molecular weight and melt flow rate can be used to determine the melt flow rate for the blend (see, for example, A. Gijsels, Ind. Polym. Process, 9,252 (1994)).

One skilled in the art will appreciate that the melt flow rate of the polymeric blends described herein is suitable for the fiber producing method of interest, for example, extrusion for staple fibers or spun bonding.

In one optional embodiment of the present invention the weight ratio of the first polyethylene and the second polyethylene is from about 1:4 to about 4:1.

In another optional embodiment of the present invention the polymeric blend comprises from about 25% to about 75% by weight of polymeric blend of the first polyethylene, and from about 25% to about 75% by weight of polymeric blend of the second polyethylene.

The polymeric blends of the present invention may be prepared in any suitable fashion, including, but not limited to, blending the desired components in the desired proportions using conventional blending techniques and apparatus, including a Banbury mixer (available from Farrel Corp., Ansonia, Conn.) or laboratory extruders, such as the Polylab Twin Screw Extruder (available from Thermo Electron (Karlsruhe), Karlsruhe, Germany) which are suitable for preparing small batches of material. Commercial scale pelletizing extruders may also be used for preparing larger blend quantities, and the like. It is even possible to prepare a premixture of pellets comprising pellets of the first polyethylene and pellets of the second polyethylene relying on intimately mixing the pellet premixture in the fiber extrusion apparatus for final mixing into the polymeric blend of the present invention (dry blending). As will be recognized, such reliance on the fiber extrusion apparatus requires careful design of extruder length, temperature profile and flight geometry to insure adequate mixing of the pellets before fiber extrusion.

First Polyethylene

The polymeric blends of the present invention comprise a first polyethylene. The density of the first polyethylene $\rho_1$ is less than the density of polymeric blend, $\rho_b$ and the $MI_1$ of the first polyethylene is less than the $MI_b$ of the polymeric blend.

In one optional preferred embodiment of the present invention the first polyethylene has a density $\rho_1$ of preferably from about 0.900 g/cm$^3$ to about 0.935 g/cm$^3$, more preferably from about 0.910 g/cm$^3$ to about 0.935 g/cm$^3$, even more preferably from about 0.920 g/cm$^3$ to about 0.930 g/cm$^3$.

The melt index of the first polyethylene $MI_1$ of the first polyethylene may be of any suitable value less than the melt index of the polymeric blend provided the polymeric blend has a $MI_b$ of from about 10 g/10 minutes to about 40 g/10 minutes. In one optional preferred embodiment of the present invention the MI, of the first polyethylene is from about 5 g/10 minutes to about 25 g/10 minutes, preferably from about 10 g/10 minutes to about 25 g/10 minutes, more preferably from about 10 g/10 minutes to about 20 g/10 minutes.

In one optional embodiment of the present invention the first polyethylene is selected from a class of ethylene polymers which have a linear polymer backbone, minimal long chain branching and a narrow molecular weight distribution. These polymers are also known as linear low density polyethylene ("LLDPE").

Linear low density PE's are ethylene-based polymers that incorporate one or several higher a olefins (propylene, butene, hexene . . . or even higher) as comonomers that are introduced into the chain in a statistical or random manner. Typically, the total amount of a olefin, blended with ethylene to make the first polyethylene is an amount of from about 0 Mol % to about 10 Mol %, preferably from about 1 Mol % to about 8 Mol %, and more preferably from about 1.5 Mol % to about 6 Mol % by weight of ethylene and at least one a olefin.

The result is a decrease in the overall crystallinity of the material owing to the lower self-similarity of the polymer chain that negatively affects its ability to crystallize. This in turn results in a reduction in crystallization temperature, even under flow, with the desirable consequences described earlier. The development of metallocene catalysts over the past 15 years has allowed polyolefin manufacturers the ability to prepare LLDPE grades with better definition and greater precision than ever before with respect to the composition and molecular weight (melt index) of the polymer chains, as well as a broader range of chemistries. Indeed, unlike traditional Ziegler catalysts, well-defined LLDPE grades with both narrow composition and molecular weight distributions may be produced. Non-limiting examples of this type of polymer may be found in U.S. Pat. No. 3,645,992.

In one preferred embodiment of the present invention the first polyethylene is a copolymer formed by the polymerization of ethylene and $C_3$ to $C_{20}$ α-olefin, wherein the polymerization is catalyzed by a metallocene catalyst.

A suitable first polyethylene is available from ExxonMobil Chemical Company of Houston, Tex. as EXXCO 012.

Second Polyethylene

The polymeric blends of the present invention comprise a second polyethylene. The density of the second polyethylene $\rho_2$ is greater than the density of polymeric blend, $\rho_b$ and the $MI_2$ of the second polyethylene is greater than the $MI_b$ of the polymeric blend.

In one optional preferred embodiment of the present invention the second polyethylene suitably has a density $\rho_2$ of from about 0.935 g/cm$^3$ to about 0.965 g/cm$^3$, preferably from about 0.940 g/cm$^3$ to about 0.960 g/cm$^3$, more preferably from about 0.940 g/cm$^3$ to about 0.955 g/cm$^3$.

The melt index of the second polyethylene $MI_2$ may be of any suitable value that is greater than the melt index of the polymeric blend provided the polymeric blend has a $MI_b$ between about 10 g/10 minutes and about 40 g/10 minutes. Suitably, $MI_2$ is between about 25 g/10 minutes and about 50 g/10 minutes, preferably from about 25 g/10 minutes to about 45 g/10 minutes, more preferably from about 30 g/10 minutes to about 45 g/10 minutes.

In one optional embodiment of the present invention the second polyethylene is also a LLDPE resin with the appropriate density and melt index. In one preferred embodiment of the present invention the second polyethylene is a LLDPE, wherein the polymerization is catalyzed by a metallocene catalyst.

A suitable second polyethylene is available from Exxon-Mobil Chemical Company of Houston, Tex. as HD6740.

Polymeric Mixture

The polymeric blends of the present invention may be blended with an adjunct as described below in order to form a polymeric mixture that is also suitable for extrusion into fibers for formation of nonwoven materials having the desirable properties described above. Such polymeric mixtures may be prepared in any suitable fashion, such as, but not limited to, blending the desired components in the desired proportions using conventional blending, techniques and apparatus, for example, a Banbury-mixer (available from Farrel Corp., Ansonia, Conn.) or laboratory extruders, such as the Polylab Twin Screw Extruder (available from Thermo Electron (Karlsruhe), Karlsruhe, Germany) which are suitable for preparing small batches of material. Commercial scale pelletizing extruders may also be used for preparing larger blend quantities, and the like.

Adjunct

The polymeric blends and polymeric mixtures of the present invention may optionally include an adjunct. Suitable adjuncts include, but are not limited to, those which are typically used in fiber making, nonwoven processing, polymer composition and polymer formation. In the case of the polymeric blend, desirable adjuncts are those which form a solid solution, that is a homogeneous mixture, with the polymeric blend and other components of the polymeric mixture, such as but not limited to the first and second polyethylenes. At any rate, the composition is substantially free of components that have both a higher density and a lower Melt Index than either blend component; or both a lower density and higher Melt Index than either the blend components.

In one aspect, the adjunct is selected from the group of minor ingredients such as: nucleating agents, antiblock agents, antistatic agents, pro-heat stabilizers, lubricants, plasticizers, ultraviolet light stabilizer (A commercially available ultraviolet light stabilizer is TINUVIN 123 available from Ciba Specialty Chemicals North America of Tarrytown, N.Y.), light stabilizers, weathering stabilizers, weld strength improvers, slip agents (oleamide or erucamide), dyes, antioxidants (A commercially available antioxidant is IRGANOX 1010 available from Ciba Specialty Chemicals North America), flame retardants, pro-oxidant additives, natural oils, synthetic oils, anti-blocking agents (siliceous chalk), fillers and combinations thereof.

In the polymeric mixture, the adjunct comprises an amount effective to achieve the result the adjunct is present in the polymeric mixture to achieve. For example, a stabilizing amount for a UV stabilizer, a lubricating amount for a lubricating agent etc. Typically, the polymeric mixture comprises from about 0.1% to about 1.0% each of one or more of such minor ingredients.

In another aspect, the adjunct is selected from the group of polymers other than the first and second polyethylenes. This group of polymers comprises two subgroups: polymers soluble in the polymeric blend and polymers insoluble in the polymeric blend.

Polymers in the soluble subgroup include but are not limited to other LLDPEs. Also suitable are low density polyethylenes with appreciable branching (LDPE). When the soluble polymer is an additional LLDPE, so as to create a tricomponent or higher component polymeric blend, the additional LLDPE preferably has density and melt index values such that the density and melt index of the additional polyethylenes fall within the rectangle defined by the density and melt index of the first and second polyethylenes. In this case, the first polyethylene is considered that polyethylene among the polyethylenes comprising the polymeric blend having the lowest density and melt index and the second polyethylene is considered that polyethylene having the highest density and melt index.

Polymers in the insoluble subgroup group are of interest because they form microinclusions in the polymeric blend that modify the properties thereof. For example, including either very low density or ultra low density ($p<0.900$ g/cm$^3$) elastomeric polyethylene resin or an EP elastomeric resin provides increased resilience to the polymeric mixture with resulting improvements in fuzz resistance, bond strength and other properties related to absorption of mechanical energy. Suitably, such second subgroup polymers may be incorporated a low level into the polymeric mixture of the present invention at a level between 1% and about 20% in order to minimize undesirable effects in the spinning process. A preferred embodiment of the polymeric mixture of the present invention incorporates between about 1% and 10% of a polymer from the insoluble subgroup into the polymeric mixture for improved resiliency. Preferably, the Melt Index of such elastomeric components is less than about 10 grams/10 minutes.

Polymers of the second subgroup can also include those polymers that form microinclusions without increasing the resiliency of the blend. Such polymers include but are not limited to polypropylene, ethylene/(alkyl)acrylate copolymers, polyesters and nylons. Without being bound by theory, it is believed that the microinclusions formed by this type of polymer interfere with the flow of segments of the polymeric chains of the first and second polyethylenes during extrusion and as a result, affect or hinder the process of flow induced crystallization thereby. Said another way, the microinclusions are believed to inhibit streamline formation during extrusion (e.g., straightening, as a result of extrusion forces, of the typical random walk configuration of a melted polymer that is not under any sort of stress). As noted above, flow induced crystallization reduction is believed to provide lower yield stress and improved cold drawability.

Fibers

It has also been surprisingly found that fibers comprising a polymeric blend or polymeric mixture having a density $\rho_b$ and a $MI_b$ in the range described herein and nonwoven materials comprising the fibers, have superior performance with regard to extensibility, softness and abrasion resistance compared to fibers produced from other polyethylenes, such as LLDPE blends, using resins having a density and a melt index outside the ranges specified herein for the first and second polyethylenes. Furthermore, the polymeric blends of the present invention will typically outperform other polyethylene resins and LLDPE blends, of comparable MI and density, especially with regard to the extent of and ease of fiber and web extensibility or cold-drawability.

Fibers comprising the polymeric blend or the polymeric mixture exhibit desirable high extensibility or cold-drawability at an unusually low stress, including drawing at high strain rate conditions (many commercial processes operate at strain rates of greater than 200 seconds$^{-1}$). Furthermore, nonwoven webs comprising such fibers exhibit a unique combination of high performance in extensibility, softness and abrasion resistance. Nonwoven webs having such a desirable combination of properties can be advantageously incorporated either alone or within a laminate in processes used for making a variety of low-cost, yet high performance disposable absorbent articles such as diapers, incontinence briefs, training pants, feminine hygiene garments, wipes, and the like, and are particularly well suited to provide key consumer benefits such as improved comfort and fit.

Specifically, the fibers of the present invention show a low yield stress at comparable ultimate tensile stress when compared to prior art fibers. Without being bound by theory, it is believed that this desirable combination of tensile properties results because the first polyethylene (low density, low melt index) provides a high ultimate tensile stress (i.e., comparable to prior art fibers) because the long polymer chains that provide the low melt index value thereof provide a "molecular backbone" to carry forces through the fiber and also into the bond sites while the second polyethylene provides the low yield stress because the lower molecular weight thereof is less prone to premature flow induced crystallization, with resulting higher yield stress, during spinning.

This desirable combination of low yield stress and high ultimate tensile stress can most conveniently be expressed in the ratio of the properties. As is shown in Table 2, the ratio of yield stress to ultimate tensile stress does not meaningfully change with increased spinning rate. In particular, for fibers comprising blends according to the present invention that are spun at high spinning rates (i.e., a rate greater than about 2000 in/min), tensile strength is maintained (i.e., ultimate tensile stress is greater than about 80 MPa) while yield stress remains quite low (i.e., less than about 30 MPa). Preferably ultimate tensile stress is greater than about 80 MPa and yield stress is less than about 25 MPa. Suitably, the ratio of ultimate tensile stress is less than about 0.30, more preferably the ratio is less than or equal to about 0.25.

As noted above, the lower yield stress of the fibers of the present invention will result easier cold drawing while the ultimate tensile stress (i.e., still comparable to fibers made using prior art resins) provides abrasion resistance and good bond strength. Said another way, fibers comprising the polymeric blend and/or the polymeric mixture of the present invention have a greater ability to extend and permanently stretch, i.e., undergo cold-drawing between the crossover points within the web or fabric, prior to reaching the maximum characteristic strength of the bond site, which ultimately determines the mechanical integrity of the web or fabric. The result is thinner cold-drawn fibers in the stretched web that provides additional softness benefits for the web that otherwise has maintained its mechanical integrity (by preventing failure of fibers at the bond sites) and good abrasion resistance.

The fibers may be of any suitable size, that is the fiber may have a diameter or equivalent diameter of from about 0.5 micron to about 200 microns. Fiber diameters or equivalent diameters between about 5 and about 30 microns are particularly preferred. Said another way, fibers incorporating the polymeric blends of the present invention are typically between about 1 and about 10 denier, preferably between about 1 and about 5 denier, more preferably between about 1.5 and about 4 denier.

In one particularly preferred embodiment, the fibers comprise bicomponent fibers for improved consolidation. Bicomponent fibers are typically used as a means of better dissociating intrinsic fiber characteristics and bonding performance, the latter being typically dominated by the sheath in the case of bicomponent fibers. As is well known, a bicomponent fiber comprises first and second polymeric components that are coextruded so as to provide the fiber with certain desirable properties from each of the polymeric components (As will be recognized both the first and second polymeric components comprise thermoplastic polymers). For example, a bicomponent fiber can comprise a first polymeric component having a lower softening temperature than the second polymeric component. Such structures reduce the risk of "burn through" during thermal consolidation.

The bicomponent fiber may be of any suitable configuration. Exemplary configurations include but are not limited to sheath-core, island-in-the sea, side-by-side, segmented pie and combinations thereof. In one optional embodiment of the present invention the bicomponent fibers have a configuration have a sheath-core configuration.

Spunbond structures, staple fibers, hollow fibers and shaped fibers such as multi-lobal fibers can all be produced which comprise the polymeric blends and mixtures of the present invention. The fibers of the present invention may have different geometries that include round, elliptical, shaped, rectangular, and other various eccentricities.

The bicomponent fibers have a size comparable to those comprising only the polymeric blend or mixture of the present invention. That is the fiber may have a diameter or equivalent diameter of from about 0.5 micron to about 200 microns. Fiber diameters or equivalent diameters between about 5 and about 30 microns are particularly preferred. Said another way, fibers incorporating the polymeric blends of the present invention are suitably between about 1 and about 10 denier, preferably between about 1 and about 5 denier, more preferably between about 1.5 and about 4 denier.

The amount of first polymeric component and second polymeric component present in the bicomponent fiber will depend upon many factors, such as but not limited to, polymers present, desired use of bicomponent fiber, desired properties of the bicomponent fiber, etc. In one optional embodiment the weight ratio of the first polymeric component to the second polymeric component is from about 1:20 to about 20:1.

In one optional embodiment of the present invention the second component of the bicomponent fiber exhibits a softening temperature greater than the softening temperature of the first polymeric component. Suitably, this difference in softening temperature is between about 1° C. and about 150° C. If both the first and second components are polyolefins, the difference in softening temperature is desirably between 1° C. and about 50° C.

Suitably, the second polymeric component is a thermoplastic polymer having an extrusion temperature that is compatible with the extrusion temperature of the first polymeric component.

Preferred thermoplastic polymers include: polyolefins, particularly polyethylenes and polypropylenes, polyamides, polyesters (including elastomeric polyesters) and polyamides.

Particularly preferred second polymeric components are polyolefins such as polypropylene. An exemplary polypropylene second polymeric component is PROFAX PH835 as is available from Basell Polyolefins of Wilmington, Del.

In addition to homopolymers, polymeric blends according to the present invention are also suitable as long as the requisite softening temperature difference is maintained. Additional suitable polymeric blends comprise blends of polypropylene resins as described in copending U.S. Pat. Application Ser. No. 60/539,298, filed in the name of Autran, et al. on Jan. 26, 2004, P&G Case 9499P.

Nonwoven Material

Typically, the fibers described above are consolidated into a nonwoven material. Consolidation can be achieved by methods that apply heat and/or pressure to the fibrous web, such as thermal spot (i.e., point) bonding. Thermal point bonding can be accomplished by passing the fibrous web through a pressure nip formed by two rolls, one of which is heated and contains a plurality of raised points on its surface, as is described in U.S. Pat. No. 3,855,046. Consolidation methods can also include, but are not limited to, ultrasonic bonding, through-air bonding, resin bonding, and hydroentanglement. Hydroentanglement typically involves treatment of the fibrous web with high pressure water jets to consolidate the web via mechanical fiber entanglement (friction) in the region desired to be consolidated, with the sites being formed in the area of fiber entanglement. The fibers can be hydroentangled as taught in U.S. Pat. Nos. 4,021,284 and 4,024,612.

These consolidated webs also possess the improved material properties discussed above in the fiber context. These properties are of particular value in converting processes where the nonwoven web is further processed (discussed below) because they impart cold extensibility to the web. As will be recognized, improved cold extensibility can result from improved elongation properties at high extension rates. These improved extension properties are obtained while substantially maintaining tensile strength that is required for satisfactory performance in areas such as abrasion resistance.

Once consolidated, the web can be further processed (i.e., converted). For example, the web, either alone or in the form of a laminate with another material can be further processed to impart stretchability thereto. Methods for imparting stretchability to an extensible or otherwise substantially inelastic material by using corrugated interengaging rolls which incrementally stretch in the machine or cross-machine direction and permanently deform the material are disclosed in U.S. Pat. No. 4,116,892, U.S. Pat. No. 4,834,741, U.S. Pat. No. 5,143,679, U.S. Pat. No. 5,156,793, U.S. Pat. No. 5,167,897, U.S. Pat. No. 5,422,172, and U.S. Pat. No. 5,518,801. In some embodiments, the intermediate structure may be fed into the corrugated interengaging rolls at an angle with respect to the machine direction of this secondary operation. Alternatively, the secondary operation may employ a pair of interengaging grooved plates applied to the intermediate structure under pressure to achieve incremental stretching of the intermediate structure in localized portions. As noted above, the nonwoven webs of the present invention are particular suitable for these and similar processes because of their particularly desirable cold extensibility.

Nonwoven materials comprising the polymer blends of the present invention are particularly useful as a component of a disposable absorbent article (e.g., as a topsheet, a cuff material, a core wrap, and when laminated to a film or, otherwise, treated to be substantially impermeable to aqueous liquids as a backsheet). Although the nonwoven web of the present invention can find beneficial use as a component of a disposable absorbent article, such as but not limited to, disposable diapers, disposable incontinence briefs, disposable training pants, disposable pads or sheets for floor cleaning systems, such as the SWIFFER® cleaning system manufactured by The Procter & Gamble Company, catamenial products, disposable wipes, and the like; its use is not limited to disposable absorbent articles. The nonwoven web of the present invention can be used in any application requiring, or benefiting from, softness and extensibility.

The nonwoven web of the present invention may be in the form of a laminate. Laminates may be combined by any number of bonding methods known to those skilled in the art including, but not limited to, thermal bonding, adhesive bonding including, but not limited to spray adhesives, hot melt adhesives, latex based adhesives and the like, sonic and ultrasonic bonding, and extrusion laminating whereby a polymer is cast directly onto another nonwoven, and while still in a partially molten state, bonds to one side of the nonwoven, or by depositing melt blown fiber nonwoven directly onto a nonwoven. These and other suitable methods for making laminates are described in U.S. Pat. No. 6,013,151 and U.S. Pat. No. 5,932,497.

Test Methods

Density

Density can be suitably measured by the use of ASTM standard method D1505. In the case of blends, where the average density is reported, the density of resin fractions in the blend may also be determined. For example, if TREF (see below) is used to characterize the composition of a blend, the density of each fraction should be determined and the fraction density weighted according to the fractional composition determined from the TREF analysis to determine the density of the blend components (identified by other analytical methods such as gel permeation chromatography and nuclear magnetic resonance).

Melt Index

Melt Index can be suitably measured by the use of ASTM standard method D1238. In the case of blends, where the average melt temperature is reported, the logarithm of the Melt Index can be calculated from that of the components by determining the linear weighted (by weight percent of the constituent resins or resin fractions in the blend) average of the logarithms melt indices for the constituent resins or fractions. For example, if TREF (see below) is used to characterize the composition of a blend, the melt index of each fraction should be measured and the log thereof determined. The logarithms of the fraction melt indices are then weighted according to the fractional composition determined from the TREF analysis to determine the logarithm of the melt index of the blend. The blend melt index can be determined via the antilogarithm.

Composition

Temperature Rising Elution Fractionation (TREF)

TREF analysis is suitable for separating a polymer sample into fractions representing the components thereof. In summary a sample is dissolved and the solution distributed over a carrier surface (e.g., a column packing material suitable for chromatography) the distributed solution is then slowly cooled to precipitate the polymer fractions in reverse order of solubility (i.e., the least soluble fractions precipitate first). After the sample has been cooled, a flowing solvent is passed over the precipitated polymer to redissolve the polymer. Discrete portions of the polymer solution formed thereby are collected, providing fractions of the sample suitable for further analysis (e.g., gel permeation chromatography to determine the molecular weight (detectors suitable for weight average, i.e., a light scattering detector or number average, e.g., a capillary viscometer or both may be used) of the fraction or nuclear magnetic resonance to determine the degree of branching in the fraction). The temperature of the solvent is slowly increased increasing the solubilization power thereof so the fractions collected represent portions of the original sample of differing solubility. This solubility difference can be attributed to differences in properties such as molecular weight, degree of branching, etc.

Sample

1) Collect a 20 g sample of the polymeric material to be tested.

Method

Suitable TREF methods and apparatus are described in Wild, L., "Advances in Polymer Science", Vol. 98 (1990) Springer-Verlag Heidelberg, Germany, pp 1-47.

Mounting of Fiber Samples

For each sample tested, 10-12 fibers are randomly selected and separated from a bundle of extruded fibers. The fibers are then taped to a paper coupon, being sure to wrap tape and the end of the fiber over the backside the coupon. Care is taken not to stretch or deform the fiber in any way.

Fiber Configuration and Diameter

Fiber configuration can be suitably measured by microscopic examination of cross sections of extruded fibers where such cross sections are taken perpendicular to the long axis of the fiber.

Fiber diameter for the circular fibers described in the Examples can be suitably measured using a Zeiss Axioskope (Carl Zeiss, Milan, Italy) microscope equipped with a color video camera and a display monitor. With the fiber (mounted as described above) in focus under a 40X objective lens and a 1X eyepiece the diameter of the fiber is measured on the monitor in inches with a pair of calipers. The microscope is calibrated for this magnification, using a 1 mm scale divided into 100ths, manufactured by Graticules LTD of Tonbridge, UK.

Denier

Denier can be suitably measured by the use of ASTM standard method D-1577.

Low Speed Tensile Properties (Fibers)

Low speed tensile properties are measured according to ASTM standard D3822. An MTS Synergie™ 400 tensile testing machine (MTS Systems Corporation, Eden Prairie, Minn.) equipped with a 10 Newton load cell and pneumatic grips may be used. Tests are conducted at a crosshead speed of 200% per minute on single fiber samples with a 2.54 cm gage length. Coupon mounted fibers are loaded into the tester grips. The paper is then cut away so as not to interfere with the test result. Samples are pulled to break. Reports include calculations for peak load (i.e., ultimate tensile stress) and elongation to break (break elongation). Yield stress is selected as the average of the stress at 20% strain and the stress at 60% strain.

Low Speed Tensile Properties (Nonwoven Materials)

Low speed tensile properties are measured according to EDANA (European Disposables and Nonwovens Association) Standard Method 20.2-89. An MTS Synergie™ 400 tensile testing machine (MTS Systems Corporation, Eden Prairie, Minn.) equipped with a 100 Newton load cell and pneumatic grips may be used. The following conditions are used:

Crosshead Speed: 127 mm/min
Gage Length: 127 mm
Sample Width: 25.4 mm

Activation Tensile Properties

Activation tensile properties may be determined using the apparatus and method described in copending U.S. patent application Ser. No. 10/377,070, entitled "Ring Rolling Simulation Press", filed in the names of Anderson, et al. on Feb. 28, 2003. The following setup conditions are used which correspond to a maximum strain rate of 500 seq$^{-1}$:

Web Temperature: 25±3° C.
Tooth Pitch: 1.52 mm
Engagement Distance: 3.65 mm
Entering Roll Diameter: 152.4 mm
Exiting Roll Diameter: 152.4 mm
Web Speed: 1.21 m/sec Fuzz Level Test This method is used as a quantitative prediction of the abrasion resistance of nonwoven or laminate materials and is accomplished by abrading a 11.0 cm×4.0 cm piece of test material with 320 grit sandpaper using a Sutherland Ink Rub Tester with a 2 pound weight. Loose microfibers are collected on an adhesive tape which is weighed to determine loose microfibers collected per unit area. Details of the method are given in published US Pat. Application 2002/0119720 A1. As practiced to evaluate materials of the present invention, the release liner delineated in the fuzz level method of the '720 application is available from American Coated Products of Zionsville, Ind. as 40# Release Paper.

EXAMPLES

The following examples illustrate the practice of the present invention but are not intended to be limiting thereof. Additional embodiments and modifications within the scope of the claimed invention will be apparent to one of ordinary skill in the art. Accordingly, the scope of the present invention shall be considered in the terms of the following claims, and is understood not to be limited to the methods described in the specification.

Example 1

This example describes the preparation of miscible blends with broad composition and broad molecular weight distributions comprising two or more linear low density polyethylene (LLDPE) components of different density and melt index.

The blends were prepared by dry-blending and compounding one or more LLDPEs in a polymer extruder to achieve optimal melt miscibility of the blend components with one another. While no analysis was made, it is believed that these resins also contained effective amounts of minor ingredients (e.g., antioxidants). The extruder used for the following examples is a Werner & Pfleiderer (30 mm diameter 40:1 length to diameter ratio) co-rotating twin-screw extruder set at 297 RPM with the first two heat zones set at 145° C. and the remaining three heating zones set at 155, 165 and 170° C. respectively. All materials were run at a mass throughput of 20 pounds per hour (9 kg/hour). Pellets of the blended resins were obtained by extruding the strand through a water bath to cool and crystallize the material, followed by passing through a pelletizer to cut the strand into pellets.

The bicomponent blends and their components are listed in Table 1 below. The components were commercial narrowly-defined or metallocene-catalyzed LLDPE grades supplied by the ExxonMobil Chemical Company of Houston, Tex. Table 1 lists density and melt index for each blend and the component resins used to prepare the blends. For the bicomponent blends, density and melt index are reported using the available rule of mixtures typically applied for miscible polymers. Also included in Table 1 are the molecular characteristics of two commercial spunbond resins available from Dow Chemical of Midland, Mich., and a blend made with these two materials.

The bicomponent blends were prepared within the typical fiber spinning preferred processing range for melt index (about 20 g/10 minutes to about 28 g/10 minutes) and with a density between 0.928 g/cm$^3$ and 0.940 g/cm$^3$.

TABLE 1

| Composition | Resin/blend Designation | Average Density (g/cm$^3$) | Average Melt Index (g/10 minutes) |
|---|---|---|---|
| A | 6811A[1] | 0.941 | 27 |
| B | 6830A[1] | 0.930 | 18 |
| C | HD6740[2] | 0.952 | 40 |
| D | EXXCO 012[3] | 0.912 | 12 |

TABLE 1-continued

| Composition | Resin/blend Designation | Average Density (g/cm³) | Average Melt Index (g/10 minutes) |
|---|---|---|---|
| E | HD6714[2] | 0.951 | 14 |
| F | LL6235[3] | 0.926 | 35 |
| G | Blend: 40%(C) & 60%(D) | 0.928 | 19.4 |
| H | Blend: 70%(C) & 30%(D) | 0.94 | 27.9 |
| I | Blend: 55%(C) & 45%(D) | 0.934 | 23.3 |
| J | Blend: 55%(A) & 45%(B)[4] | 0.936 | 22.5 |
| K | Blend: 40%(E) & 60%(F)[5] | 0.936 | 24.3 |
| L | EG8100[6] | 0.870 | 1.0 |
| M[7] | Blend: 90%(A) & 10%(L) | 0.934 | 19.5 |
| N | HD6733[2] | 0.951 | 33 |
| O | Blend: 50%(N) & 50%(D) | 0.932 | 19.9 |
| P[8] | Pro-fax PH835 | 163 | 34 |
| T[9] | AtoFina Propylene 8650 | 134 | 11 |
| U[10] | ACHIEVE 3825 | 151 | 32 |
| V | Blend: 35%(T)/65%(U)[11] | 145.1 | 22 |
| W[12] | WINTEC WFX4T | 125 | 7.3 |
| X | Blend: 35%(W)/65%(U)[11] | 141.9 | 18.8 |

[1]Aspun ™ Fiber Grade Resin from Dow Chemical company, Midland, MI
[2]High density polyethylene resin from ExxonMobil Chemical Company of Houston, TX
[3]Linear low density polyethylene resin from ExxonMobil Chemical Company of Houston, TX
[4]Comparative example
[5]Comparative example
[6]Affinity Polyolefin Plastomer from Dow Chemical Company, Midland, MI
[7]Comparative example
[8]Basell Polyolefins (Wilmington, DE) Ziegler-Natta controlled rheology propylene homopolymer
[9]AtoFina Chemicals Houston, TX high ethylene Ziegler-Natta random polypropylene copolymer
[10]ExxonMobil metallocene polypropylene homopolymer
[11]Type 2 polypropylene blend as described in copending U.S. Provisional patent application Ser. No. 60/539,298, filed in the name of Autran, et al. on Jan. 26, 2004.
[12]Japan Polypropylene (Tokyo, Japan) metallocene propylene/ethylene random copolymer The density($\rho$) and Melt Index (as a logarithm, i.e., log MI) of each of these materials is plotted in FIG. 1 As can be seen these plots define two orthogonal axes. The axis having a negative slope represents blends which are called a Type 1 blends (e.g., blend K) herein. As used herein, a Type 2 blend represents a blend according to the present invention and is represented as lying along a line having a positive slope in FIG. 1 (e.g., blends G, H, and I). At the intercept of the two axes two comparative examples (blends J and K) that possess comparable average density and average molecular weight, while also being constructed from very different components. As will be seen in subsequent examples, Type 1 and Type 2 blends have very different properties.

Example 2

Fiber Spinning

Neat or compounded materials were melt spun into fibers using a two extruder system, where each extruder is a horizontal single-screw extruder. The extrudate rate from each extruder to the spinpack is controlled by a metering melt pump that feeds a 4-hole spin pack (Hills Incorporated, W. Melbourne, Fla.). The extruders were set up to deliver the resin or resin blend to the melt pump at a temperature of about 200° C. The mass throughput was maintained constant at approximately 0.8 grams/hole/minute. In all examples the spinpack is fitted with a spinneret for a round hole, and distribution plates for sheath-core cross-section. For the monocomponent fibers of this example, the same resin is used in both extruders for a sheath-to-core ratio of approximately 50:50. The extruder/melt pump/spinpack system is mounted on an adjustable height platform. In these examples, the spin line length was maintained constant at a distance of approximately 1.78 meters. The molten filaments exit the spinneret into a quench cabinet that is located directly below the spinpack and are drawn down with a height adjustable air drag device that uses compressed air at high pressures to produce a stream of air that surrounds and draws the filaments. A series of fiber diameters is collected by varying the air gun inlet pressure and the air gun type.

Fibers were spun at various drawdown ratios and collected for tensile testing. The rate of fiber spinning is defined by the amount of drawdown imparted onto the fiber in the spinning process. It is directly related to the final diameter of the spun fiber, for a given known polymer throughput and a given spinnerette diameter. The following examples, summarized in Table 2, provide the results of testing fibers with some of the polymer compositions listed in Table 1.

TABLE 2

| LLDPE Blend/Resin Extrude | I[3] | H[3] | K[5] | J | A[4] | B[4] | M |
|---|---|---|---|---|---|---|---|
| Avg. Yield Stress[1] (Mpa) | 13.05 | 15.4 | 15.1 | 18 | 16.75 | 18.3 | 18.6 |
| Ultimate Tensile Stress[1] (Mpa) | 49.5 | 48.9 | 41.6 | 52.6 | 48.5 | 62.8 | 61.4 |
| Yield Stress/Ultimate Tensile Stress[1] | 0.26 | 0.31 | 0.36 | 0.34 | 0.35 | 0.29 | 0.30 |
| Avg. Yield Stress[2] (Mpa) | 22.5 | 25.35 | 34.4 | 45.1 | 32.4 | 36.15 | 49.4 |
| Ultimate Tensile Stress[2] (Mpa) | 90 | 81.7 | 71.8 | 108.6 | 82.9 | 90 | 130 |
| Yield Stress/Ultimate Tensile Stress[2] | 0.25 | 0.31 | 0.48 | 0.42 | 0.39 | 0.40 | 0.38 |

[1]Measured on fibers extruded at low spinning rates(900-1100 m/min).
[2]Measured on fibers extruded at high spinning rates(2000-2400 m/min).
[3]Type 2 Blends of the present invention
[4]Resin marketed as suitable for fiber spinning by Dow Chemical Company of Midland, MI
[5]Blend of 40% E and 30% of a first linear low density polyethylene (LL6201) and 30% of a second linear low density polyethylene (LL6100) designed to match the average density and average melt index of composition K of Table 1. Both linear low polyethylenes are available from ExxonMobil Chemical Company of Houston, TX Example 3

This example describes the physical properties of small-scale webs made with some of the LLDPE fiber formulations described above.

Fibers were spun on a small pilot-scale extrusion line that was equipped with a 144-hole spin pack (Hills Incorporated, W. Melbourne, Fla.) and a fiber-spreading device enabling the fibers to be laid down into a web. Fibers are drawn down with a height adjustable air drag device that uses compressed air at high pressures to produce a stream of air that surrounds and draws the filaments. In all examples the spinpack is fitted with a spinneret for a round hole, and distribution plates for sheath-core cross-section. The spinpack is fed by two extruders. For the fibers of the present example, the same resin is used in both extruders. (This same apparatus was used to extrude the bicomponent structures discussed in Example 4).

All webs being compared in this example were made of fibers that were spun under comparable processing conditions (extrusion, die and drawdown) to produce fibers of comparable fiber diameter (~3.8 denier). This is important as it ensures that the softness for the different webs is comparable. Mass throughput was maintained constant for all samples at 0.6 grams per hole per minute. Basis weight of the webs was also kept constant at approximately 30 grams per square meter (gsm). This allows comparison of the webs on the basis of the other performance aspects (extensibility, mechanical integrity, fuzz).

Thermal-point bonding of the webs was done off-line at relatively slow web speed (28 ft/min) using a set of heated calendar rolls. Three different bonding temperatures were selected in the vicinity of the expected optimum bonding temperature to consolidate the fibers into webs. As expected, the efficiency of the thermal web bonding process depends upon the temperature and exhibits an optimum between underbonded webs at low temperatures (where initial fibers can separate too easily) to overbonded ones (where the fibers undergo extensive and/or excessive transformation at the bond sites). This optimum is dependent upon the melting temperature of the fibers, which in turn depends upon the density. Bonding temperatures used in these trials range from 107° C. for the lower density grades and 113° C. for the higher ones.

TABLE 3

| Resin/Blend | Basis Weight (g/m$^2$) | Fiber Diameter (micron) | Bonding T. (° C.) |
|---|---|---|---|
| A | 30 | 24 | 113 |
| B | 31 | 24 | 107 |
| J | 33 | 24 | 110 |
| G | 32 | 24 | 107 |
| G | 32 | 24 | 110 |
| M | 30 | 29 | 107 |

Fuzz Level and mechanical property data were measured for the lower density Exxon Type-11 blend (Blend G) and compared to both higher and lower density Dow components and their blend (Resins A and B and Blend J). Two different bonding temperatures are reported for the Exxon blend (107° C. and 110° C.). Table 4 lists the mechanical properties measured on the webs. These data are reported in Table 4.

TABLE 4

| Resin/Blend | CD Tensile Strength (N/2.54 cm) | CD Tensile Elongation (%) | Activation Strain Percent (%) | Fuzz (mg/cm$^2$) | Activation Load (N/cm) |
|---|---|---|---|---|---|
| A | 11.4 | 167 | 162 | 0.20 | 8.6 |
| B | 12.4 | 155 | 189 | 0.49 | 9.5 |
| J | 15.5 | 187 | 180 | 0.59 | 9.4 |
| G[1] | 16.4 | 176 | 203 | 0.27 | 7.2 |
| G[2] | 13.5 | 140 | 184 | 0.14 | 10 |
| M | 11.3 | 135 | 223 | 0.55 | 9.8 |

[1]Consolidated at 107° C.
[2]Consolidated at 110° C.

Mechanical properties are represented both by low-speed tensile properties (Tensile Strength, Tensile Elongation) on one hand, and by simulated high-speed activation characteristics, namely Activation Load and Activation Strain Percent, on the other. Low-speed tensile values are dominated by the mechanical integrity of the bond sites and provide a measure of their strength. A high Tensile Strength is indicative of strong bond sites and a high integrity web. High-speed activation data are influenced not only by bond site integrity, but also by the drawability of the fibers within the web. High Activation Strain Percentages and abrasion resistance (low Fuzz Level) are most desirable for nonwoven materials used in contemporary disposable absorbent articles. Table 4 clearly shows the present invention represents a substantial improvement in overall mechanical properties.

Example 4

This example describes physical properties of webs made with certain LLDPE bicomponent fiber formulations. Bicomponent fibers were spun in which various blends from Example 1 were specifically extruded into the sheath of fibers, while the core of the fiber consisted of commercially available resins or blends selected to "match" the sheath's melt index and density. Essentially the same spinning process was used with the exception that the materials were spun into bicomponent fibers using a two extruder system and a spinpack fitted with spinnerets and distribution plates for the desired sheath/core cross-section.

As can be seen in Table 5, all bicomponent fibers were spun into similar fiber size, the denier of the bicomponent-fibers being higher in average than the homo-component fibers described in example 3 (5.6 vs. 3.8 denier). The ratio sheath/core was kept in between 30/70 and 50/50 for all fibers.

TABLE 5

| Sheath/Core Composition | Basis Weight (g/m$^2$) | Fiber Diameter (microns) | Bonding Temperature (° C.) |
|---|---|---|---|
| 50/50 H/A | 34 | 29 | 113 |
| 30/70 I/J | 25 | 28 | 110 |
| 50/50 G/B | 36 | 30 | 110 |
| 30/70 K/J | 32 | 29 | 110 |

Table 6 lists low and high speed properties for the various bicomponent nonwoven materials.

TABLE 6

| Sheath/Core Composition | Tensile Strength (N) | Tensile Elongation (%) | Activation Strain (%) | Fuzz Level (mg/cm$^2$) | Activation Load (N/cm) |
|---|---|---|---|---|---|
| 50/50 H/A | 11.1 | 207 | 157 | 0.23 | 5.9 |
| 30/70 I/J | 9.1 | 181 | 219 | 0.24 | 6.7 |
| 50/50 G/B | 10 | 161 | 274 | 0.23 | 6.5 |
| 30/70 K/J | 3.7 | 158 | 211 | N/A | 6.7 |

Example 5

Nonwoven Production

The following example demonstrates extrusion and formation of nonwoven materials comprising bicomponent fibers on a spunbond nonwoven pilot line. Nonwoven materials having the compositions and properties described in Table 7 were prepared at a pilot scale on a 1 meter wide spunbond pilot line with a slot jet attenuation system. The webs were produced at a mass throughput of about 0.3 grams per hole per minute and thermally consolidated with one of two different bonding patterns. Pattern S has diamond shaped bond sites with a total bond area of 14% and a bond density of 32 bonds/cm$^2$. Pattern A has square bond sites with a total bond area of 15% and a bond density of 26 bonds/cm$^2$. All of the bicomponent fibers have a sheath comprising polyethylene for ease of thermal bond formation and a core comprising polypropylene for mechanical integrity.

TABLE 7

| Sheath/Core Composition | Basis Weight (g/m$^2$) | Fiber Diameter (microns) | Bonding Temperature (° C.) |
|---|---|---|---|
| Bond pattern S | | | |
| 50/50 A/P | 26.4 | 22.3 | 116 |
| 50/50 O/P | 26.2 | 20.5 | 118 |
| 50/50 O/V | 32.6 | 22.2 | 116 |
| Bond Pattern A | | | |
| 50/50 O/P | 23 | 19 | 116 |
| 50/50 O/X | 25 | 19 | 113 |
| 50/50 O/X | 25 | 19 | 110 |

The mechanical properties of the nonwoven webs are shown in Table 8.

TABLE 8

| Sheath/Core Composition | CD Tensile Strength (N/2.54 cm) | Activation Strain -CD Percent (%) | Fuzz Level (mg/cm$^2$) | CD Activation Load (N/cm) |
|---|---|---|---|---|
| Bond pattern S | | | | |
| 50/50 A/P | 5.8 | 196 | 0.24 | 5.0 |
| 50/50 O/P | 8.2 | 166 | 0.22 | 5.8 |
| 50/50 O/V | 8.9 | 150 | 0.19 | 5.8 |
| Bond Pattern A | | | | |
| 50/50 O/P | 5.6 | 141 | 0.22 | 4.0 |
| 50/50 O/X[1] | 5.7 | 161 | 0.19 | 4.85 |
| 50/50 O/X[2] | 6.6 | 157 | 0.23 | 5.1 |

[1]Consolidated at 113° C.
[2]Consolidated at 110° C.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fiber comprising a polymeric blend, the polymeric blend comprising:
    (a) a first linear low density polyethylene having a density $\rho_1$ and a melt index $MI_1$ of from about 10 g/10 minutes to about 25 g/10 minutes; and
    (b) a second linear low density polyethylene having a density $\rho_2$ and a melt index $MI_2$ of from about 25 g/10 minutes to about 50 g/10 minutes;
    wherein said polymeric blend has a density $\rho_b$ of from about 0.925 g/cm$^3$ to about 0.945 g/cm$^3$, a melt index $MI_b$ of from about 10 to about 40 g/10 minutes; and
    wherein $\rho_1 < \rho_b < \rho_2$, $MI_1 < MI_b < MI_2$, and $MI_2/MI_1 \geq 2.0$.

2. The fiber according to claim 1, wherein for the polymeric blend, $\rho_2 - \rho_1 \geq 0.015$.

3. The fiber according to claim 1, wherein for the polymeric blend, the weight ratio of the first polyethylene to the second polyethylene is from about 1:4 to about 4:1.

4. The fiber according to claim 3, wherein for the polymeric blend, density $\rho_1$ is from about 0.900 g/cm$^3$ to about 0.935 g/cm$^3$, and density $\rho_2$ is from about 0.935 g/cm$^3$ to about 0.965 g/cm$^3$.

5. The fiber according to claim 1, wherein for the polymeric blend, the first polyethylene is a copolymer of ethylene and a $C_3$ to $C_{20}$ α-olefin.

6. The fiber according to claim 5, wherein for the polymeric blend, the ethylene/$C_3$ to $C_{20}$ α-olefin copolymer is a metallocene polyethylene.

7. The fiber according to claim 1, wherein for the polymeric blend, the second polyethylene is a copolymer of ethylene and a $C_3$ to $C_{20}$ α-olefin.

8. The fiber according to claim 7, wherein for the polymeric blend, the polymerization thereof is catalyzed by a metallocene catalyst.

9. A fiber comprising a polymeric blend, the polymeric blend comprising:
    (a) a first linear low density polyethylene having a density $\rho_1$ of from about 0.900 to about 0.935 g/cm$^3$, and a melt index $MI_1$ of from about 10 g/10 minutes to about 25 g/10 minutes; and
    (b) a second linear low density polyethylene having a density $\rho_2$ of from about 0.935 g/cm$^3$ to about 0.965 g/cm$^3$, and a melt index MI of from about 25 g/10 minutes to about 50 g/10 minutes;

wherein said polymeric blend has a density $\rho_b$ of from about 0.925 g/cm$^3$ to about 0.945 g/cm$^3$, and a melt index $MI_b$ of from about 10 to about 40 g/10 minutes; and
wherein $\rho_1 < \rho_b < \rho_2$, $MI_1 < MI_b < MI_2$, and $MI_2/MI_1 \geqq 2.0$.

10. The fiber according to claim 9, wherein for the polymeric blend, $\rho_2 - \rho_1 \geqq 0.015$.

11. The fiber according to claim 9, wherein for the polymeric blend, the weight ratio of the first polyethylene to the second polyethylene is from about 1:4 to about 4:1.

* * * * *

UNITED STATES PATENT AND TRADEMARK OFFICE
CERTIFICATE OF CORRECTION

PATENT NO.         : 7,927,698 B2                         Page 1 of 1
APPLICATION NO.    : 12/842102
DATED              : April 19, 2011
INVENTOR(S)        : Autran et al.

It is certified that error appears in the above-identified patent and that said Letters Patent is hereby corrected as shown below:

Column 6

Line 3, delete "MI," and insert --$MI_1$--.

Column 9

Line 21, delete "in/min" and insert --m/min--.

Signed and Sealed this
Twenty-eighth Day of February, 2012

David J. Kappos
*Director of the United States Patent and Trademark Office*